C. Williams.
Dredger.

No 12,651.   Patented Apr. 3, 1855.

UNITED STATES PATENT OFFICE.

C. WILLIAMS, OF JACKSON, TENNESSEE.

EXCAVATING-MACHINE.

Specification of Letters Patent No. 12,651, dated April 3, 1855.

*To all whom it may concern:*

Be it known that I, C. WILLIAMS, of Jackson, in the county of Madison and State of Tennessee, have invented a new and Improved Excavating-Machine; and I do hereby declare that the following is a full, clear, and exact description of the same, reference being had to the annexed drawings, making a part of this specification, in which—

Figure 1:
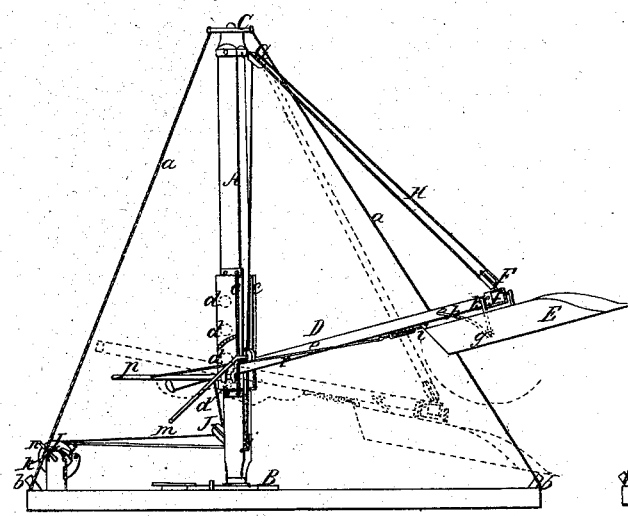
Figure 2:
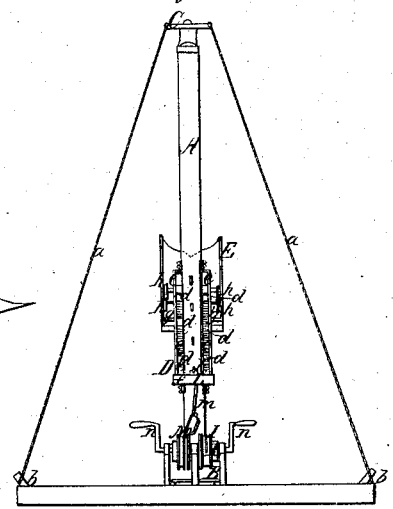
Figure 3:
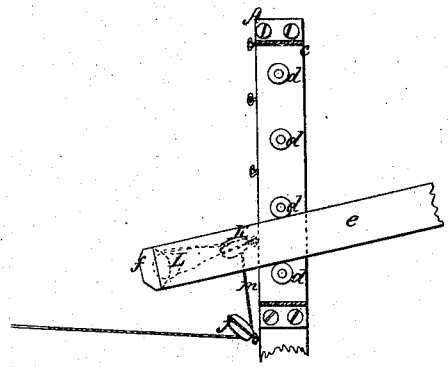

Figure 1, is a side view of my improved excavating machine. Fig. 2 is a back view of ditto. Fig. 3, is a view of a portion of the upright pole showing the friction rollers at one side of the pole and one side of the frame or shaft of the scoop or shovel between them.

Similar letters of reference indicate corresponding parts in the several figures.

This invention relates to a new and improved excavating machine, and consists in having the frame or shaft to which the scoop or shovel is attached, work upon an upright pole which is allowed to rotate or turn, the frame or shaft working between friction rollers on the pole as will be hereafter shown and described.

To enable others skilled in the art to make and use my invention, I will proceed to describe its construction and operation.

A, represents an upright pole the lower end of which is properly stepped in a plate B, which is firmly secured to the ground in any proper manner. The top of the pole has a cap C, upon it which forms a bearing for the upper end of the pole, said cap being retained in proper position by ropes or chains (a), the lower ends of which are secured to stakes (b) driven in the ground. The pole A, is allowed to turn or rotate between the plate B, and cap C. The pole A, is of square or rectangular form and has metal guide plates (c) (c) secured to two of its opposite sides as shown in Figs. 1 and 2. The guide plates project sufficiently far from the sides of the pole to allow friction rollers (d) to be placed between them and the sides of the pole, the axes of the rollers working in the guides plates (c) and in proper bearings in the sides of the pole.

D, represents a frame or shaft to the outer end of which a scoop or shovel E, is attached. The frame or shaft is formed of two bars (e) (e) conected at their ends by cross pieces (f) (f). These bars (e) (e) are fitted between the guide plates (c) (c) and the sides of the pole A, and work between two of the friction rollers (d) at each side of the pole as clearly shown in Fig. 3.

The scoop or shovel E, is suspended at each side by pivots (g) to pendants or arms (h) (h) which project downward from the outer end of the frame or shaft D, two from each side. The back part of the scoop or shovel is heavier than the front part, and the back part is secured to the frame or shaft D, by a spring catch (i) shown in Fig. 1.

To the outer end of the frame or shaft D, there is secured a block F, and a block G, is secured to the upper end of the pole A, see Fig. 1, a rope H, is attached to the block G, said rope passing through the block E, at the end of the frame or shaft D, and then through the block G, and passing downwards underneath a pulley (j) in the lower part of the pole A, and is then secured to a drum I, provided with a ratchet (k) in which a pawl (l) catches.

J, is a block attached to the lower end of the pole A, and K, is a block attached to the pole A, between the two bars (e) (e) of the frame or shaft D, shown clearly in Fig. 3.

L, is a pulley in the cross piece (f) at the back end of the frame or shaft D, also shown in Fig. 3. A rope (m) is attached to the block K, said rope passing around the pulley L, through the blocks K, and J, and is then attached to a drum M, by the side of the drum I, and precisely similar to it, see Fig. 2. The axes of the two drums are provided with cranks (n).

The scoop or shovel E, when filled is raised by turning the drum I, the rope H, being wound upon said drum, when sufficiently elevated the scoop or shovel is turned around over the spot where the contents of the scoop or shovel is to be dropped by turning the pole A, by means of a lever (p) see Fig. 1, attached to the pole. The spring catch (i) is then drawn back by a cord (r) and the back end of the scoop or shovel drops or tilts downward and the contents fall out. The scoop or shovel then returns to its original position and is swung around to its former place and the scoop or shovel and the end of the frame or shaft D, descend by their own gravity, and the scoop or shovel is thrust forward into the earth by turning the drum M, until it is filled. The scoop or shovel is then raised again and emptied of its contents as above described.

The above invention is simple, not liable to get out of repair and will work well. The frame or shaft D, working between friction rollers on the pole A, prevents a loss of power in consequence of friction and renders the construction of the machine extremely simple.

The machine may be worked by horse or steam power applied in any proper manner.

Having thus described my invention, what I claim as new and desire to secure by Letters Patent is.

Having the frame or shaft D, of the scoop or shovel E, formed of two bars (e) (e), and having said bars working between friction rollers (d) in guide plates (c) (c) at opposite sides of the pole A. The frame or shaft and shovel being operated by the means herein shown or by their equivalents.

C. WILLIAMS.

Witnesses:
I. W. COOMBS,
I. G. MASON.